United States Patent [19]

Strauch

[11] 4,205,314
[45] May 27, 1980

[54] DEVICE FOR MEASURING THE RANGE OF A MOVING TARGET AND THE SPEED AT WHICH IT APPROACHES OR RECEDES

[75] Inventor: Raymond Strauch, Viroflay, France

[73] Assignee: Telecommunications Radioelectriques et Telephoniques T.R.T., Paris, France

[21] Appl. No.: 862,005

[22] Filed: Dec. 19, 1977

[30] Foreign Application Priority Data

Dec. 29, 1976 [FR] France ................ 76 39390

[51] Int. Cl.² ........................ G01S 9/44; G01S 9/02; G01S 9/23
[52] U.S. Cl. ................................ 343/9 R; 343/7.5; 343/17.5
[58] Field of Search ............ 343/9 R, 17.5, 7.5, 343/8

[56] References Cited

U.S. PATENT DOCUMENTS

| | | | |
|---|---|---|---|
| 2,537,593 | 1/1951 | Landon et al. | 343/17.5 X |
| 3,605,094 | 9/1971 | Peperone | 343/17.5 X |
| 3,680,092 | 7/1972 | Scott | 343/9 X |
| 3,896,436 | 7/1975 | Johnson | 343/9 X |
| 4,008,473 | 2/1977 | Hinachi et al. | 343/7.5 R |
| 4,008,475 | 2/1977 | Johnson | 343/7.5 X |
| 4,079,377 | 3/1978 | Heiden et al. | 343/9 R |

*Primary Examiner*—S. C. Buczinski
*Attorney, Agent, or Firm*—Algy Tamoshunas

[57] ABSTRACT

A radio range measuring apparatus having a controlled modulation slope in order to keep the beat frequency between the transmitted signal and the received signal constant. The apparatus also measures the speed at which a mobile target approaches or recedes by means of a generator of a fixed frequency which, after frequency division, maintains the duration between the start of two consecutive sawtooth modulation signals fixed. A particular spectral line of the beat signal is demodulated by this fixed frequency via a mixer whose output is filtered by a passband filter. The signal at the output of the filter has a frequency which is equal to the Doppler frequency, proportional to the speed.

4 Claims, 2 Drawing Figures

DEVICE FOR MEASURING THE RANGE OF A MOVING TARGET AND THE SPEED AT WHICH IT APPROACHES OR RECEDES

The invention relates to a device for measuring the range of a target and the speed at which it approaches or recedes, comprising a high frequency signal generator for generating a linearly frequency-modulated high-frequency signal under the control of a modulator generating a sawtooth signal having a first control input for controlling the duration T of the sawtooth signal. The device further comprises means for transmitting the high frequency signal towards a target, means for receiving the high frequency signal reflected by the target and means for generating the beat signal between the transmitted and the received signals. A phase locked loop comprising a frequency discriminator having a center frequency $f_o$ receives the beat signal and furnishes an error signal which is applied to the first control input of the modulator for modifying the slope of the sawtooth in order to keep the frequency of the beat signal constant and equal to $f_o$.

The object of the invention is to simultaneously measure the range and the relative speed at which a predetermined target approaches or recedes from the measuring position for a range of slow speeds which may be in the order of a few centimetres per second. In addition, it may be desired to obtain the sign of this speed.

It is known in devices of the type mentioned in the preamble, to use the drift of the range signal to obtain speed measurements. Such devices are, for example, described in Applicant's French Patent Application No. 74 35 433, which discloses an radioaltimeter arranged in a manner such that the speed signal is obtained by a simple deduction with respect to the transit time of the supplied range signal. A specific field of application of the invention is in controlling the mooring of a big ship, in particular an oil tanker, involving very low speeds. A ship is a complex target which is subjected to the action of the tides In addition, the land-based measuring device must be at a distance in the order of fifty to one hundred meters from the mooring point for safety reasons and in order to operate under all tide conditions, the tide difference possibly being up to eight meters. For these reasons, the transmitting antenna should not be too directional, so that the entire ship with its superstructures acts as the target. Because of this restriction the range measurement varies in an apparently random manner in the order of two percent. Although this is acceptable for range indication, such a variation makes it practically impossible to measure the speed by means of simple deduction. It will, in fact, be difficult to distinguish this very low speed from noise. It is an object of the invention to solve the abovementioned problem by adapting the device mentioned in the preamble to a relative speed measurement by utilizing the Doppler effect.

It is known, particularly from United Kingdom Patent Specification Nos. 671 461 and its addition 671 464 to use the Doppler effect for measuring the speed of a moving target. However, the system described in these specifications is a radar system intended for locating any moving body and hence has a panoramic field of view, whereas the device accoring to the invention has a sectional field of view which is directed towards a specific known, moving target The United Kingdom Specification, on the other hand, deals with detection of moving bodies whose speeds are within a certain range without giving any further information about possible speed differences between them. In addition, this system generates a sawtooth transmission frequency having a fixed modulation slope and consequently operates according to a different principle than the device according to the invention. In the latter the modulation slope of the transmitted frequency varies as a function of the range. The device according to the invention being characterized in that it comprises a further generator for generating a signal with a fixed frequency $f_1$ which is equal to the average value of $f_o$, means for generating a signal, having a frequency $f_1/n$, where n is the order of the harmonics of the modulating signal of the transmission whose frequency is nearest to $f_o$, which means has an output signal which controls said modulator by means of a second control input of said modulator in order to render the duration between the start of two consecutive sawtooths constant and equal to the value $n/f_1$, a first mixer which receives at a first input the signal of said fixed frequency $f_1$ and at a second input said beat signal and, arranged in cascade at the output of said mixer, a first passband filter having a maximum cut-off frequency equal to $f_1/2n$ and a frequency meter which supplies at its output data of the absolute speed value.

The main idea of the invention is, whilst retaining the control of the modulation slope of the frequency transmitted for the precision range measurement, to keep the duration between the start of the two consecutive sawtooths fixed, which defines a periodicity of the duration $T_r$ of the transmitted signal and which consequently fixes the frequency of the lines of the spectrum of beat signal $f_b$ between the transmitted signal and the received signal. So, whereas the duration $T'$ between the end of a sawtooth and the beginning of the next sawtooth is constant in the conventional radioaltimeter, this duration $T'$ is, on the contrary, variable in the device according to the invention in such a way that the duration: $T_r = T' + T$ is constant, T being the variable duration of a sawtooth, which is related in a known, linear manner and unchanged to the distance to be measured. So for the precision speed measurement a particular line of the beat signal $f_b$ is demodulated by a signal having a frequency which is equal to that of this particular line in the absence of the Doppler effect. This particular line is preferably near the center frequency $f_o$ of the frequency discriminator of the control loop, in such a manner that it has a large amplitude.

The invention will now be explained in greater detail by way of non-limitative example, with reference to the accompanying drawings, in which.

Figure 1:
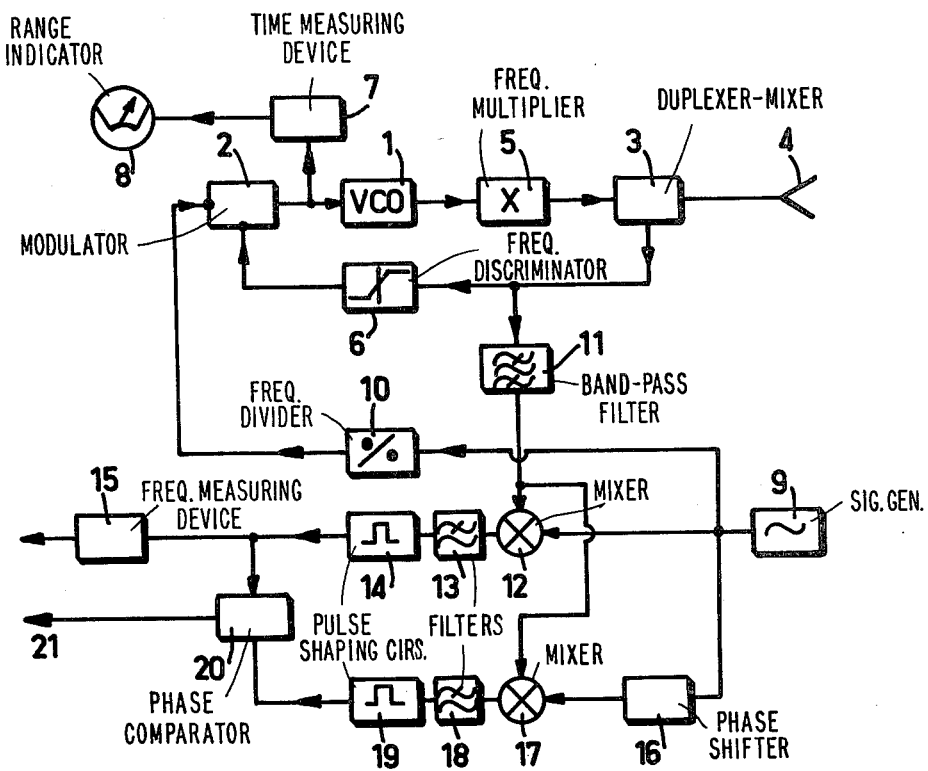
FIG. 1 is the block diagram of a preferred embodiment of the radio range meter according to the invention.

The upper part of FIG. 1 corresponds to the circuit diagram of a conventional radio ranging system which comprises a high frequency signal generator 1 having an input connected to the output of a modulator 2 and an output connected to the input of a circuit for processing the high frequency signal it supplies. This circuit comprises, for example, a duplexer-mixer 3, a directional transmitting-receiving antenna 4 and, optionally, a frequency multiplier 5 included between the generator and the duplexer-mixer 3. The modulator 2 produces a sawtooth voltage having a variable duration T which is proportional to the distance D between the measuring place and a pre-selected target, owing to the fact that a control loop which comprises a frequency discriminator 6 having a substantially fixed center frequency $f_o$ connects the output of the duplexer-mixer 3 to a first input of the modulator 2, which permits varying the slope of the sawtooth. Discriminator 6 receives the beat signal $f_b$ between the transmitted signal and the received signal and supplies at its output an error signal corresponding to the frequency variation between the frequency $f_o$ and the beat frequency $f_b$. The error signal causes the slope of the sawtooth to vary in a manner such that the beat frequency is kept constant and substantially equal to $f_o$. The following, conventional, relation can therefore be written:

$$D = (f_o \cdot c / = 2\Delta F) T, \quad (1)$$

where:

F is the frequency variation of a sawtooth which is kept constant, and c is the propagation speed of the electromagnetic waves.

The element 7 is a time measuring device which derives from the sawtooth signal supplied by the modulator 2 a signal which is proportional to the duration T of the sawtooth and, consequently, proportional to the distance D in accordance with formula (1). Its output is connected to a range indicator 8.

The advantage of the device according to the invention, shown in FIG. 1, is that it allows measurement of the relative speed by utilizing the Doppler effect with a precision which is superior to the precision obtainable by known systems from the duration of the range signal obtained at the output of the element 7, which precision is required, especially for low speeds.

To this end, the output of a generator 9 of a fixed frequency $f_1$, equal to frequency $f_o$ with slight variations relative to the latter, is connected to the input of a frequency divider 10 having the ratio n, n being an integer whose value is specified herebelow. The output of divider 10 is connected to a second input of the modulator 2. The function of the fixed frequency $f_1/n$ signal at the second input of the modulator is to maintain the duration Tr between the start of two consecutive sawtooth waves constant. This duration is exactly the duration of the period $n/f_1$ of the signal of frequency $f_1/n$ so that whatever the duration of T $n/f_1 > T$.

On the other hand, the beat signal $f_b$ is derived from the output of the duplexer-mixer 3 and applied to the input of a bandpass filter 11. The passband of the filter is centered around the frequency $f_1$ and has a width such that it passes some lines of the spectrum of $f_b$. This filter is not indispensable for a proper operation of the device. However, it corresponds to a preferred embodiment for it enables selection of the useful portion of the beat signal, that is to say, that portion which corresponds to the main target aimed at. The output of filter 11 is connected to the input of the mixer 12, whose second input is connected to the output of generator 9. The output of the mixer 12 supplies a signal which does not contain, in the absence of the Doppler effect, a low frequency. If, on the other hand, the Doppler effect is present, said line of the order n of the spectrum of $f_b$ being shifted for the same reason as all the other lines of the Doppler frequency $f_d$, a low beat frequency appears between this line of the order n and the signal of the frequency $f_1$, which is exactly equal to the Doppler frequency, in the output signal of the mixer 12 in the form of a demodulation. A bandpass filter 13 is connected to the output of mixer 12. The filter has a low cut-off frequency of $f_1/2n$, that is to say half the frequency of the fundamental mode (1/2Tr) and its function is to select only the low Doppler frequency $f_d$ from the signal it receives. A pulse-shaping circuit 14 and a frequency measuring device 15 are connected in cascade to filter 13. The function of the frequency measuring device is to measure the low frequency of the output signal of the mixer 12 via the filter 13 and to supply an output signal which is proportional to the Doppler frequency and, consequently, proportional to the absolute value of the speed of approach or recession between the target and the measuring place.

It should be noted that for a proper operation of the device, the presence of divider 10 is desirable as a frequency shift produced by the generator 9 is proportionally fed back, via the divider 10, to the input of the modulator 2. In this way it is possible to cancel the effect of a drift on each of the two inputs of the mixer 12. If, for example, two separate frequency generators with fixed frequencies $f_1$ and $f_1/n$, respectively are used instead of the generator 9 and the dividier 10, these frequency generators must be very stable due to the fact that the least frequency drift of one of these two oscillators would produce an error, at the output of the mixer 12, exceeding the Doppler frequency one tries to measure being e.g. in the order of 3 Hz for a speed of 10 cm/s.

The advantage of using a generator 9 and a divider 10 is that it is not necessary for the generator 9 to have a very high stability. It is sufficient that its short term stability, for example in the order of magnitude of one second, is good enough to still assimilate the spectrum of the beat signal $f_b$ to a line spectrum.

Figure 2:
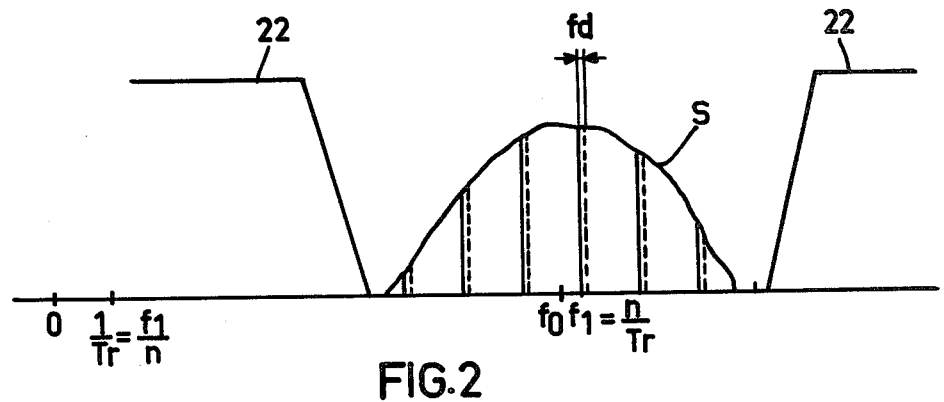
FIG. 2 shows a portion of the spectrum of the beat signal between the transmitted signal and the received signal.

In FIG. 2 reference character S represents the portion of the spectrum, originating from the main object, in the form of various lines and their envelopes. Reference numeral 22 shows schematically the attenuation curve of the filter 11, if present, of FIG. 1. The signal of FIG. 2 is consequently the signal obtained at the output of filter 11. The center frequency $f_o$ of discriminator 6 is purposely shown slightly different from the fixed frequency $f_1$, which is the frequency of the line n of the spectrum, which corresponds to a slight drift of the discriminator and/or generator 9 for example, time drift or temperature drift. It is obvious that such a drift of discriminator 6 does not in any way affect the precision of the measurement one wants to make. Actually, the line of the order of n, which is shown by means of a solid line in the absence of the Doppler effect and by means of a dotted line with a shift which is equal to the Doppler frequency $f_d$ when the Doppler effect is present (for example in the case of an approaching target), always remains near the amplitude of the maximum of the envelope and it is desirable, but not indispensable, that this line is in any case the line having the greatest amplitude. For the realisation of the device, an average value of $f_o$ being determined, the value of $f_1$ is chosen equal to this average value $f_o$. FIG. 2 also shows the fixed frequency of the fundamental ($1/Tr = f_1/n$) of the spectrum of $f_b$.

In accordance with a further preferred embodiment of the device according to the invention a supplementary circuit (FIG. 1) is provided for supplying in a known manner, an indication of the sign of the speed.

This circuit comprises, connected in cascade, starting from the output of the generator 9, a phase shifter 16, a frequency mixer 17, a bandpass filter 18 which is identical to the filter 13, a pulse-shaping circuit 19 and a phase comparator 20, whose output is indicated by reference numeral 21. The phase shifter 16 shifts the signal it receives at its input by $\pi/2$. The mixer 17 receives at a second input the output signal of the circuit 11 and the phase comparator 20 determines which of the two output signals of the circuits 14 and 19 leads the other one and deduces at its output 21 the sign of the speed. A device which indicates the speed in an algebraic value, not shown, receives the output signals of the elements 15 and 20.

What is claimed is:

1. An apparatus for measuring the range and the recessional or approach speed of a target comprising means for generating a radio signal, means for frequency modulating said radio signal by a triangular waveform modulating signal of duration T to produce a linearly frequency modulated radio signal, means for transmitting said frequency modulated radio signal toward said target, means for receiving the radio signal reflected from said target, means for generating a beat signal between the transmitted and received signals, a frequency discriminator coupled to said beat signal generating means, said discriminator having a center frequency $f_o$ and generating an error signal corresponding to the difference between $f_o$ and the frequency of said beat signal, said error signal being coupled to said modulating means and controlling the slope of said triangular waveform of said modulating signal generated thereby so as to maintain the frequency of said beat signal equal to $f_o$, means for deriving from said triangular waveform a signal indicative of the range of the target, further means for generating a first signal of a constant frequency $f_1$ which is equal to the average value of $f_o$, means coupled to said modulating means for producing a second signal of a constant frequency $f_1/n$, where n is the order of the harmonics of the transmitted modulation signal whose frequency is nearest to $f_o$, said second signal controlling said modulating means so as to maintain the duration Tr between the start of two consecutive triangular waveforms of said modulating signal constant and equal to $n/f_1$, a mixer having an output, a first input coupled to said further means and a second input coupled to said means for generating said beat signal, a bandpass filter having an output and having an input connected to the output of said mixer, said filter having a maximum cut-off frequency equal to $f_1/2n$, and means coupled to said output of said filter for measuring the frequency of the signal at the output of said filter, the measured frequency being indicative of the velocity of the target relative to said apparatus.

2. The apparatus according to claim 1 wherein said means for producing said second signal includes a divider coupled to said further means for producing from said first signal said second signal of frequency $f_1/n$.

3. The apparatus according to claim 1 including a bandpass filter with a passband centered around $f_1$ connected between said means for generating said beat signal and said second input of said mixer.

4. The apparatus according to claim 1 including means coupled to said further means for shifting the phase of said signal of frequency $f_1$ by $\pi/2$ radians, a second mixer having an output and a pair of inputs, means for applying said phase shifted signal to one input of said second mixer, means for applying said beat signal to the other input of said second mixer, a second bandpass filter of the same characteristics as said first-named filter, said second filter having an output and an input connected to said output of said second mixer and a phase comparator having a pair of inputs connected to the outputs of said first and second filters, respectively, for generating at an output a signal indicative of whether said target is approaching or receding from said apparatus.

* * * * *